J. R. McWANE.
CAST IRON PIPE.
APPLICATION FILED JAN. 26, 1917.

1,264,198.

Patented Apr. 30, 1918.

WITNESSES
Jas. K. McCathran
H. T. Chapman

INVENTOR
James R. McWane,
BY C. G. Siggers
ATTORNEY

United States Patent Office.

JAMES R. McWANE, OF BIRMINGHAM, ALABAMA.

CAST-IRON PIPE.

1,264,198. Specification of Letters Patent. Patented Apr. 30, 1918.

Application filed January 26, 1917. Serial No. 144,767.

*To all whom it may concern:*

Be it known that I, JAMES R. McWANE, a citizen of the United States, residing at Birmingham, in the county of Jefferson and State of Alabama, have invented a new and useful Cast-Iron Pipe, of which the following is a specification.

This invention has reference to cast iron pipe and its object is to provide a form of cast iron pipe and joint therefor particularly adapted for small sizes of cast iron pipe.

Cast iron pipe is particularly advantageous for underground work because of its great resistance to underground conditions, experience having demonstrated that cast iron pipe lasts indefinitely under ground, while steel pipe will rust out in the course of time. Even when steel pipe is protected by galvanizing or other means, it frequently gives way and will rust at screw-threaded portions or other unprotected parts.

Objection has been found to the use of cast iron pipe in the smaller sizes because it is difficult and expensive to properly form the joints when bell and spigot joints are used in the smaller sizes, while if put together with screw joints as ordinary steel pipe is put together, the line is too rigid and the pipe breaks under the strain of settling. Moreover, a stiff screw-jointed cast iron pipe will not take care of expansion and contraction, and breakage results.

Undue stiffness and the strains of expansion and contraction are readily avoided by bell and spigot joints, since such joints are flexible and allow for expansion and contraction, but small pipes have to be made in such short sections that the putting together of such pipe joints in a ditch is a very expensive and tedious process.

By the present invention all the advantages of bell and spigot joints are retained because such joints are actually used, but the expense and disadvantage of making many joints in a ditch in the laying of the pipe is avoided by forming the bells separately and providing screw-threaded connections between the bells and the corresponding ends of the cast iron pipes. In this way the bells may be attached to the spigot ends of the pipes in the foundry where there may be every convenience for such work, and it may be expeditiously and cheaply performed, and much better performed than could be done in the ditch. Then all that is necessary is to screw the ends of the pipes remote from those connected to the bells into the bells already joined to the next pipe sections in order. In this way small cast iron pipes, and therefore cast iron pipes of short lengths, are readily adapted to underground work, and all the advantages of cast iron pipe for underground work are retained with respect to small pipes that are obtained in the use of large cast iron pipes for underground work.

The invention will be best understood from a consideration of the following detailed description taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1:
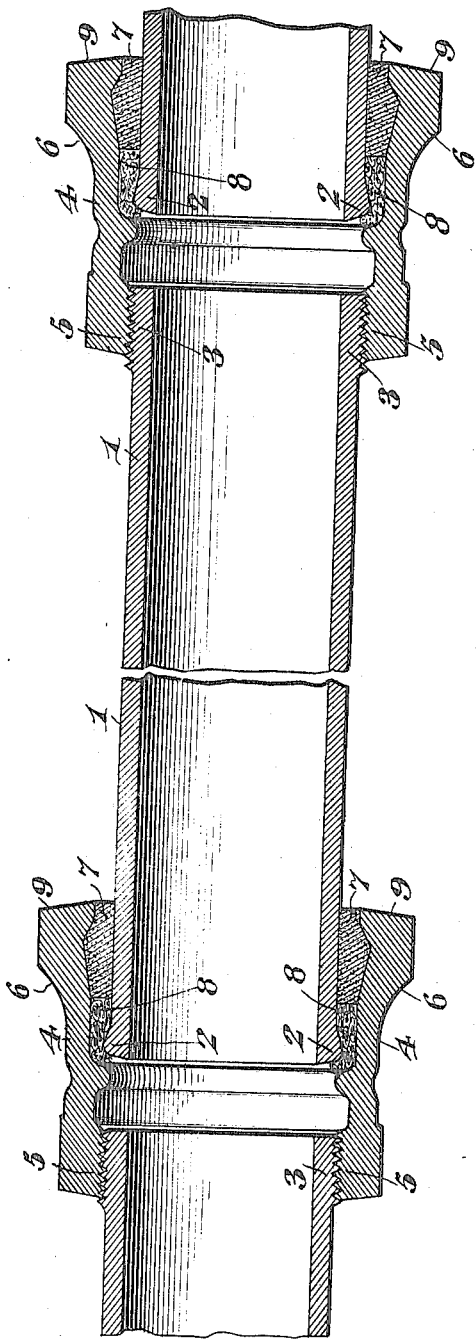
Figure 1 is a longitudinal diametric section of adjacent lengths of cast iron pipe constructed in accordance with the invention.
Figure 2:
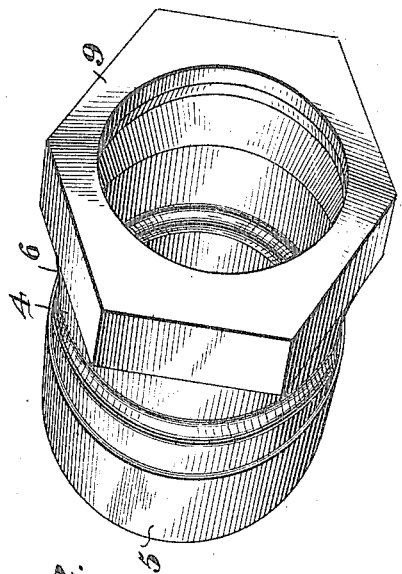
Fig. 2 is a perspective view of a separate bell for cast iron pipe.

Referring to the drawings, there is shown in Fig. 1 lengths 1 of pipe assumed to be cast iron pipe, each length having a spigot end 2 and in place of a bell end being provided with an exteriorly threaded portion 3. There is also provided a separate bell 4 having one end 5 interiorly screw threaded to receive the screw-threaded end 3 of a length 1 of cast iron pipe, the bell 4 also being of cast iron. That end of the bell 4 remote from the end 5 is expanded into a spigot receiving portion 6 of the usual construction employed in bell and spigot pipes, and is joined to the bell end by lead 7 and jute 8, or in any other suitable manner, the ordinary lead-calked joint being shown in the drawings.

Besides, the bell end 4 being formed separately from the pipe 1 and having an interiorly threaded portion 5, the bell portion 6 of the pipe is exteriorly polygonal, as shown at 9, for the reception of a holding tool permitting the screwing of the pipe 1 into the bell end 4. Ordinarily bell and spigot pipes have no polygonal (usually hexagonal) portion 9, but with the present invention it is advantageous to have such portion 9 in order to hold the pipe while being manipulated. Of course, the hexagonal portion 9 may be elsewhere located than as shown, or it may be omitted and reliance be had upon an ordinary pipe wrench.

The pipes are cast and threaded at the foundry and the bells are cast and threaded at the foundry, and, moreover, the bells are applied to the spigot ends of the pipes at the foundry and may be shipped therefrom ready for the pipes to be screwed together in the ditch.

The bells are joined to the spigot ends of the pipes at the foundry with far greater certainty and facility than is possible in the ditch. The lead may be melted in large quantities and the calking can be done cheaply and quickly with pneumatic tools.

The particular form of calked joint shown is one commonly used but, of course, any other suitable form of joint may be employed, the invention providing for the formation of the joint at the foundry instead of in the ditch.

In this way small cast iron pipe may be laid far more rapidly than can the ordinary bell and spigot cast iron pipe be laid in the ditch or trench when the bells are integral parts of the pipe.

The calked or other similar joint provides the degree of flexibility and permits the contraction and expansion so necessary in the case of cast iron pipe to prevent breakage, since strains which would be harmless to steel pipe connected by screw joints would be fatal to cast iron pipe. Steel pipe, however, is of relatively short life when buried in the ground, while cast iron pipe will last indefinitely under the same circumstances provided the pipe is not put under undue strain from lack of flexibility or opportunity to expand and contract.

What is claimed is:—

1. In cast iron pipe construction, a bell and spigot cast iron pipe, with the bell initially separate from the body of the pipe and permanently united to the spigot end of the pipe by packing, and the other end of the pipe and the portion of the bell remote from that permanently fastened to the spigot end of the pipe being provided with matching screw threads.

2. A cast iron pipe having one end formed with exterior screw threads and the other end of spigot construction, and a cast iron bell having one end provided with internal screw threads to receive the threaded end of a pipe and the other end in housing relation to the bell end of the pipe and permanently united thereto by a joint of bell and spigot construction.

3. A cast iron pipe having one end of spigot construction and the other end exteriorly screw-threaded, and a cast iron bell housing and permanently united to the spigot end of the pipe by a flexible bell and spigot joint with one end of the bell extending beyond the pipe to which it is united and there formed with interior screw threads to receive the threaded end of another pipe, said bell and spigot parts having portions interlocking with the material of the joint to prevent extended longitudinal movements of said parts on each other.

4. A bell and spigot cast iron pipe section, having a separately formed cast-iron bell housing the spigot end, with a flexible, fluid-tight joint permanently anchoring the bell to the spigot end of the pipe section, and the other ends of the pipe and bell having means whereby complete pipe sections may be rigidly coupled together, to provide a cast-iron pipe line with previously formed bell and spigot joints.

5. A unitary sectional pipe composed of a bell end and a spigot end with the bell end permanently united to the spigot end by a bell and spigot packed joint, and the outer ends of the pipe and bell portions being screw threaded for attachment to the corresponding ends of other pipe sections, whereby the pipe sections when laid may be screwed together and the bell and spigot joints may be completed before the pipe sections are laid.

In testimony that I claim the foregoing as my own, I have hereto affixed my signature in the presence of two witnesses.

JAMES R. McWANE.

Witnesses:
 E. W. HERRMANN,
 C. W. HENRY.